(12) United States Patent
Warszawski et al.

(10) Patent No.: US 9,047,021 B2
(45) Date of Patent: Jun. 2, 2015

(54) MANAGING METADATA FOR LOGICAL VOLUME MANAGERS

(71) Applicant: Red Hat Israel, Ltd., Raanana (IL)

(72) Inventors: Eduardo Warszawski, Kfar Saba (IL); Ayal Baron, Kiryat Ono (IL)

(73) Assignee: Red Hat Israel, Ltd., Raanana (IL)

( * ) Notice: Subject to any disclaimer, the term of this patent is extended or adjusted under 35 U.S.C. 154(b) by 184 days.

(21) Appl. No.: 13/747,162

(22) Filed: Jan. 22, 2013

(65) Prior Publication Data

US 2014/0208045 A1 Jul. 24, 2014

(51) Int. Cl.
*G06F 12/12* (2006.01)
*G06F 3/06* (2006.01)

(52) U.S. Cl.
CPC ............ *G06F 3/0665* (2013.01); *G06F 3/0619* (2013.01); *G06F 3/067* (2013.01)

(58) Field of Classification Search
CPC ..... G06F 3/0634; G06F 1/3221; G06F 3/064; G06F 12/121; G06F 3/067; G06F 3/0665; G06F 3/061; G06F 3/0631; G06F 3/0643; G06F 3/0619; G06F 3/0683
USPC .................................................. 711/114, 162
See application file for complete search history.

(56) References Cited

U.S. PATENT DOCUMENTS

| 2006/0112219 A1* | 5/2006 | Chawla et al. ................. 711/114 |
| 2006/0136684 A1* | 6/2006 | Le et al. ......................... 711/154 |
| 2010/0088626 A1* | 4/2010 | Rubanovich .................. 715/773 |

* cited by examiner

*Primary Examiner* — Hashem Farrokh
(74) *Attorney, Agent, or Firm* — Lowenstein Sandler LLP

(57) ABSTRACT

A logical volume manager (LVM) may manage a plurality of logical volumes and a plurality of drives in a logical data storage using metadata stored on the plurality of drives. The LVM may operate in one of two modes. In the first mode, the LVM may deleted uncommitted metadata on a drive and may use committed metadata on the drive when accessing a logical volume. In a second mode, the LVM may use committed metadata on the drive when accessing the logical volume and may refrain from deleting the uncommitted metadata.

20 Claims, 7 Drawing Sheets

US 9,047,021 B2

MANAGING METADATA FOR LOGICAL VOLUME MANAGERS

TECHNICAL FIELD

Embodiments of the present invention relate to a computer system, and more specifically, to logical volume managers.

BACKGROUND

Many network architectures use virtual machines (VMs) and physical machines (e.g., a laptop computer, a desktop computer, a tablet computer, a network, a computer system, a computing device, etc.) to perform various functions and tasks. A virtual machine (VM) is a software implementation of a machine (computer) that includes its own operating system (referred to as a guest operating system) and executes application programs. A host computer allocates a certain amount of its resources to each of the virtual machines, and multiplexes its underlying hardware platform among the virtual machines. Each virtual machine is then able to use the allocated resources to execute its guest operating system and applications. The software layer providing the virtualization is commonly referred to as a hypervisor and is also known as a virtual machine monitor (VMM), a kernel-based hypervisor, or part of a host operating system. The hypervisor emulates the underlying hardware of the host computer, making the use of the virtual machine transparent to the guest operating system and the user of the computer. A host controller (e.g., a server) may manage (e.g., create/remove virtual machines, shut down virtual machines), monitor (e.g., monitor system resources used by hosts and/or virtual machines), configure (e.g., change hardware, software and/or guest operating systems on virtual machines), and/or control the virtual machines.

The VMs and/or the physical machines may use multiple drives (e.g., hard disk drives, flash drives, disc drives, mass storage devices, etc.) to store and/or access data, applications, files, etc. The drives may be located on one or more computing devices or computing systems (e.g., one or more server computers, one or more laptop computers, etc.) For example, there may be seven drives, and three of the drives may be located in one server computer, and the remaining four drives may be located on a different server computers. The VMs and/or the physical machines may use logical volume managers (LVMs) to manage, allocate, and use the multiple drives. An LVM may allow multiple drives to be partitioned, allocated, and/or organized according to a logical organization or structure. This may allow the LVM to create logical volumes (e.g., a virtual disk partition) according to the preferences or requirements of users (e.g., administrators or other people using the VMs and physical machines). For example, the LVM may use the storage space provided by two physical drives and may create a single logical volume from the two physical drives (e.g., may allocate a logical volume). The LVM may allow a VM and/or a physical machine (e.g., a laptop computer) to use the two physical drives as if they were a single partition or a single volume by logically grouping the two physical drives into the logical volume. The LVM may use metadata (e.g., LVM metadata) on the drives to store the configuration details of the logical volume groups. For example, the metadata may store information such as which partitions and/or portions of the physical drives belong to which logical volume and the storage parameters of the logical volumes (e.g., block size, sector size, number of tracks, etc.). In another example, the metadata may store information such as identifications (e.g., names, identifier numbers or values, etc.) for drives, logical volumes, and/or volume groups, the amount of free space, used space, and/or allocated space on the drives, logical volume groups, and/or logical volumes, permissions (e.g., read only, read-write, etc.) for logical volumes and/or logical volume groups, etc.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein are systems and methods of managing metadata for LVMs (e.g., logical volume managers). LVMs use metadata stored on one or more drives to create, manage and/or access volume groups and/or logical volumes in a logical data storage. An LVM may attempt to write new metadata when updating one or more volume groups and/or logical volumes. Once the new metadata is completed or finalized, the LVM may commit the new metadata so that it can be used for future access to the logical data storage. Traditional LVMs may delete uncommitted metadata (e.g., pending metadata) on the drives when the traditional LVMs detect the uncommitted metadata. This may cause the metadata on the drives to become corrupted or inconsistent when multiple LVMs attempted to access and/or update the metadata for the logical data storage. For example, a traditional LVM that is reading data from the logical data store may delete uncommitted metadata that another traditional LVM is currently trying to write to the drives in the logical data store.

Embodiments of the invention allow an LVM to operate in one of two modes. The first mode allows the LVM to delete uncommitted metadata and/or write new metadata to the drives. The second mode allows the LVM to read committed metadata, but does not allow the LVM to delete uncommitted metadata or write new metadata to the drives. When a group of LVMs use the same logical data storage, only one of the LVMs may operate in the first mode at any given time. The remaining LVMs may operate in the second mode. Because only one LVM in the group of LVMs is operating in the first mode at any given time (e.g., only one LVM is able to write new metadata or deleted uncommitted metadata), the metadata on the drives may remain consistent and/or uncorrupted.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1A:
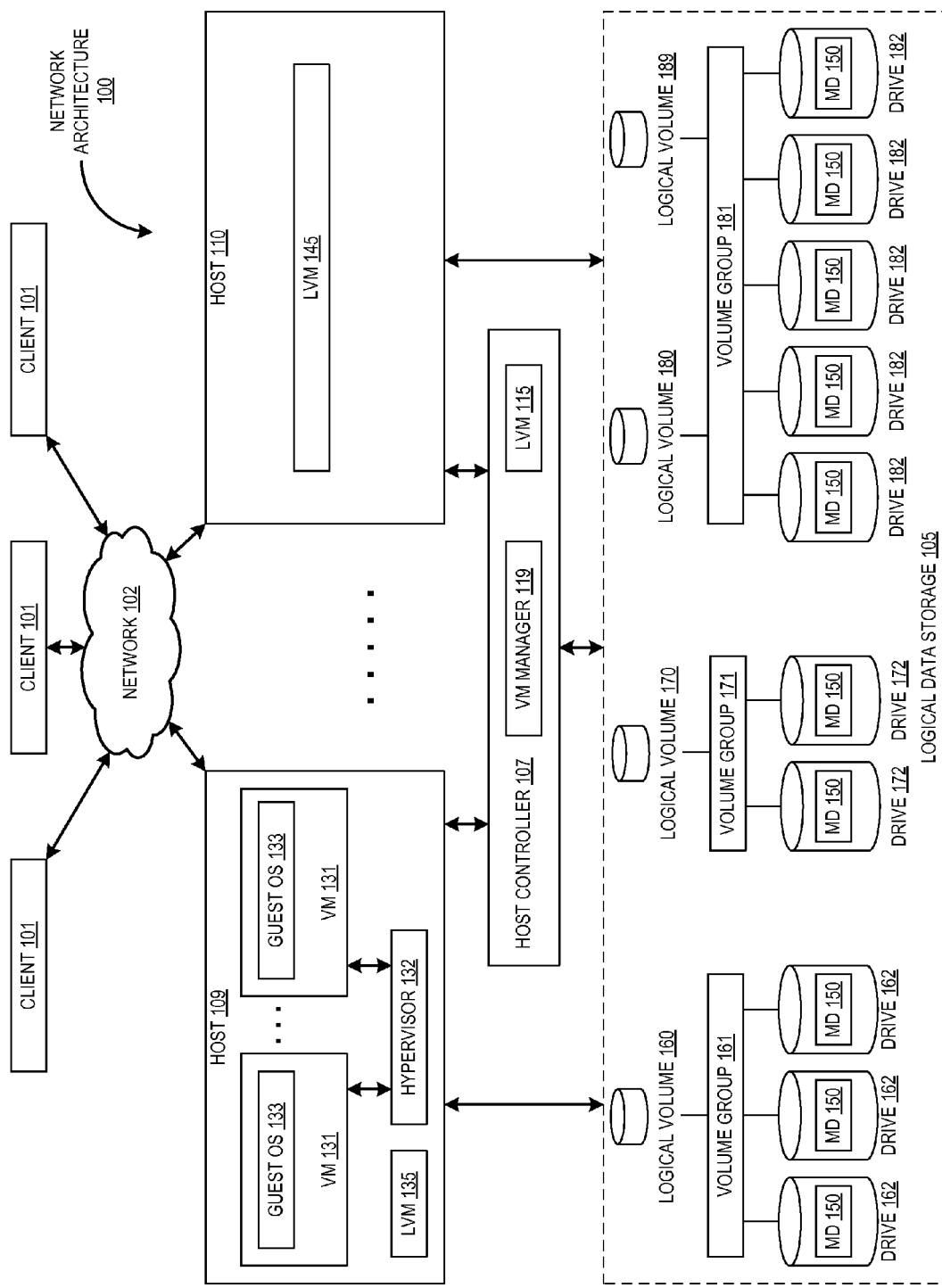
FIG. 1A is a block diagram of an example network architecture in which some embodiments of the disclosure may operate.

FIG. 1A illustrates an example network architecture 100 in which embodiments of the present invention may operate. The network architecture 100 includes hosts 109 and 110 coupled to clients 101 over a network 102. The hosts 109 and 110 may be a personal computer (PC), a server computer, a personal digital assistant (PDA), a smart phone, a laptop computer, a tablet computer, or any machine capable of executing a set of instructions (sequential or otherwise) that specify actions to be taken by that machine. The network 102 may be a private network (e.g., a local area network (LAN), a wide area network (WAN), intranet, etc.), a wireless network (e.g., a Wi-Fi network or a cellular network), or a public network (e.g., the Internet). The hosts 109 and 110 are coupled to a host controller 107. Host 109 includes LVM 135, host 110 includes LVM 145, and host controller 107 includes LVM 115. The hosts 109 and 110, and the host controller 107 are coupled to logical data storage 105. The logical data storage 105 includes drives 162, drives 172, and drives 182. The hosts 109 and 110, and the host controller 107 may use their corresponding LVMs (e.g., LVM 135, LVM 145, and LVM 115) to access and/or manage the drives 162, 172, 182, and the logical data storage 105.

The host 109 also includes an LVM 135 (e.g., a logical volume manager). As discussed above the LVM 135 may manage, allocate, and use the drives 162, 172, and 182 in the logical data storage 105. The LVM 135 may partition, allocate, and/or organize the drives 162, 172 and 182 according to a logical organization or structure. This allows the LVM 135 to create logical volumes (e.g., logical volumes 160, 170, 180 and 189) according to the preferences or requirements of users (e.g., administrators or other users of the VMs 131 or the hosts 109 and 110).

The LVM 135 may group drives 162, 172, and 182 together to form one or more volume groups (e.g., a pool of storage space from one or more drives). The drives 162 are grouped together to form volume group 161, the drives 172 are grouped together to form volume group 171, and the drives 182 are grouped together to form volume group 181. In one embodiment, portions of the drives 162, 172, and/or 182 may be grouped together to form one or more volume groups (not shown in the figure). For example, a portion of drive 162 and a portion of drive 172 may be grouped together to form a volume group. The LVM may use the volume groups 161, 171, and 181 to create one or more logical volumes 160, 170, 180, and 189. A logical volume may be a virtual disk partition (e.g., a partition that may not be based on actual physical partitions and/or physical drives). This may allow the LVM 135 to create logical volumes according to the preferences or requirements of users (e.g., administrators or other users of the VMs 131 and hosts 109 and 110). For example, if a 9 gigabyte (GB) storage space is required by a user, the LVM may form a 9 GB logical volume from three different physical drives, each drive being 3 GB in size. The VMs 131 and/or the host 109 may access the logical volumes 160, 170, 180, and 189 using the LVM 135, as if it were a single physical volume, partition, and/or drive.

The LVM 135 may use metadata (MD or LVM metadata) 150 to store the configuration details of the logical volumes 160, 170, 180, and 189. For example, the metadata 150 may store information such as which partitions and/or portions of the (physical) drives 162, 172, and/or 182 are mapped to (e.g., belong to) which logical volume, and/or the storage parameters of the logical volumes (e.g., block size, track size, sector size, etc.). The metadata 150 stored on the drives 162 may indicate that the drives 162 are part of logical volume 160. The metadata 150 stored on the drives 172 may indicate that the drives 172 are part of logical volume 170. The metadata 150 stored on the drives 182 may indicate that the drives 182 are part of logical volume 180 and 189. For example, two of the drives 182 may be part of logical volume 180 and three of the drives 182 may be part of logical volume 189. In another example, some parts of the drives 182 may be part of logical volume 180 and the remaining parts of the drives 182 may be part of the logical volume 189. In one embodiment, the metadata 150 may indicate a mapping between the drives 162, 172, and 182, and the logical volumes 160, 170, 180, and 189 (e.g., may indicate which drives or portions of the drives are mapped to or used by which logical volumes). In one embodiment, the metadata 150 (e.g., LVM metadata) may be "committed" or finalized metadata. Committed or finalized metadata may be metadata that was created successfully (has been made permanent) and will be used for accessing the logical data storage 105 (e.g., for accessing the one or more of the logical volumes 160, 170, 180, and 189).

In one embodiment, the LVM 135 may update one or more of the logical volumes 160, 170, 180, 189 and/or one or more of the volume groups 161, 171, and 181 (e.g., may update and/or modify the logical data storage 105). For example, the LVM 135 may reallocate (e.g., re-map) one of drives 162 from the volume group 161 to the volume group 171, in order to increase the size of the logical volume 170. In another example, the LVM 135 may de-allocate (e.g., map) one of the drives 182 from the volume group 181 and create a new volume group (not shown in the figures) and new logical volume. In a further example, the LVM 135 may allocate (e.g., map) a new drive (not shown in the figures) to one of the volume groups 161, 171, and 181, or may create a new volume group and new logical volume using the new drive. When the LVM 135 updates and/or modifies the logical data storage 105, the LVM 135 may modify the metadata 150 stored on the drives 162, 172 and 182, to update metadata 150 with the configuration details for the new logical structure (e.g., the new allocation or mapping of drives or portions of drives, to volume groups and/or logical volumes).

In one embodiment, the LVM 135 may create the new metadata (shown in FIG. 2A) that contains the new configuration details for the new logical structure when the LVM 135 modifies and/or updates the logical data storage 105. The LVM 135 may store the new metadata on the drives 162, 172, and 182, when the LVM 135 makes changes, modifies and/or updates the logical data storage 105 (e.g., allocates or maps a drive to a different volume group or logical volume, add a new drive to the logical data storage 105, etc.). The new metadata may not take effect (e.g., may not be used by the LVMs 135, 145, and 115) until the new metadata is committed or finalized by the LVM 135. After the LVM 135 commits or finalizes the new metadata, there may be two different (previous and new finalized or committed) metadata stored on the drives 162, 172, and 182 (shown in FIG. 2B). If there are two different finalized or committed metadata stored on the drives 162, 172, and 182, the LVM 135 may use the latest or most recently committed metadata.

The LVM 145 on the host 110 and the LVM 115 on the host controller 107 may perform operations, functions, and services, similar to those described for LVM 135. For example, each of the LVMs 145 and 115 may be used to manage, access, update, and/or modify the logical data storage 105. In another example, the host 110 may use the LVM 145 to access data stored on a logical volume (e.g., on one or more of the drives 162, 172, and 182). In a further example, the host controller 107 may use the LVM 115 to reallocate (e.g., map) a drive form one volume group to another volume group, or to add a new drive to the logical data storage 105.

Generally, when a traditional LVM performs an operation on logical data storage 105 or accesses the logical data storage 105, the traditional LVM may analyze the different metadata (e.g., two committed metadata, one committed metadata and one uncommitted metadata) stored on the drives. For example, if the traditional LVM attempts to determine which logical volumes exist in the logical data storage 105, the traditional LVM may access the metadata stored on the drives. If there is an uncommitted metadata on the drive, the traditional LVM generally deletes the uncommitted metadata because the uncommitted metadata is not finalized and thus should not be used to determine the configuration details of the logical data storage 105. Generally, traditional LVMs will remove uncommitted metadata regardless of the type of operation the traditional LVMs is performing on the logical data storage 105. For example, even if the traditional LVM is only reading data from one or more of the logical volumes (e.g., from one or more of the drives), the traditional LVM may determine that uncommitted metadata exists on the one or more drives and may delete the uncommitted metadata from the one or more drives. In another example, if the traditional LVM is attempting to update the logical data storage 105 (e.g., add a new drive to a volume group, reallocate or re-map a drive from one volume group to another, etc.) the traditional LVM will also delete uncommitted metadata if it is present on the one or more drives. Because traditional LVMs remove uncommitted metadata, the metadata on the drives may become corrupted or inconsistent if multiple traditional LVMs attempt to access, update, and/or manage the logical data storage 105. For example, if a first traditional LVM attempts to add a new disk, the first traditional LVM may create new, uncommitted metadata. Before the first traditional LVM can commit the new, uncommitted metadata, a second traditional LVM may attempt to read data from the logical data storage 105 and may delete the uncommitted metadata created by the first traditional LVM.

In one embodiment, LVMs 135, 145, and 115 may each operate in one of two different modes. If an LVM (e.g., LVM 135) is operating in a first mode (e.g., a write access mode or a write mode), the LVM may be allowed to write new metadata and delete uncommitted metadata if the LVM determines that there is uncommitted metadata stored on the drives. For example, if an LVM operating in the first mode attempts to access a logical volume and the LVM determines that there is uncommitted metadata on one or more of the drives for the logical volume, the LVM may delete the uncommitted metadata because the LVM may determine that a previous LVM crashed before it was able to commit the uncommitted metadata. If an LVM is operating in a second mode (e.g., a read-only mode or a read mode), the LVM may not be permitted to delete uncommitted data if the LVM determines that there is uncommitted metadata stored on the drives and may not be permitted to write new metadata to the drives. For example, if a first LVM that is operating in the second mode attempts to access a logical volume (e.g., read data from logical volume 160) while a second LVM (that is operating in the first mode) updates the logical data storage 105 and writes new uncommitted metadata, the first LVM will use the committed metadata that is on the drives and may ignore and/or may not delete the uncommitted metadata (e.g., may refrain from deleting the uncommitted metadata).

In one embodiment, when a group of LVMs (e.g., LVM 135, 145, and 115) share access to the logical data storage 105, only one LVM in the group of LVMs may be operating in the first mode (e.g., write access mode or write mode) at any given time. The remaining LVMs in the group of LVMs may operate in the second mode (e.g., read-only mode or read mode). For example, only one of LVM 135, 145, or 115 may operate in the first mode at any given time. The remaining LVMs may operate in the second mode. Because only one LVM in the group of LVMs may operate in the first mode, the other LVMs in the group are not able to delete the uncommitted metadata that the one LVM operating in the first mode is attempting to write to the drives.

In one embodiment, when a group of LVMs (e.g., LVM 135, 145, and 115) share access to the logical data storage 105, the different LVMs may switch between operating in the first mode (e.g., write mode) and the second mode (e.g., read mode). For example, initially, the LVM 115 may operate in the first mode, and the LVMs 135 and 145 may operate in the second mode. After a period of time, the LVM 115 may no longer operate in the first mode and may switch to operating in the second mode along with the LVM 145. The LVM 135 may switch from operating in the second mode to operating in the first mode.

In one embodiment, a central computing device or computing system may select which one of the LVMs in a group of LVMs (e.g., LVM 135, 145, and 115) may operate in the first mode (e.g., write mode). For example, the network architectures may include multiple hosts 109 and multiples hosts 110, each with their own LVMs 135 and 145. The host controller 107 may select one of the LVMs 135 and 145 to operate in the first mode and may indicate to the remaining LVMs 135 and 145 that they should operate in the second mode (e.g., read mode). The host controller 107 may later select a different one of the LVMs 135 and 145 to operate in the first mode. In another embodiment, the different LVMs in the group may work in combination with each other to selected one of the LVMs to operate in the first mode. For example, the different LVMs may communicate with each other to determine which one of the different LVMs should operate in the first mode using a leader election algorithm. Different embodiments may use a variety of methods, algorithms, and/or functions to select which one of the LVMs in a group of LVMs should operate in the first mode. For example, a leader election algorithm (e.g., an algorithm used to select one entity from a group of entities so that the one entity may control, manage, or organize the group of entities) may be used or a round-robin scheduling algorithm may be used. Other types of methods, algorithms, and/or functions for selected an LVM to operate in the first mode may include but are not limited to, a time-based scheduling algorithm, a priority-based scheduling algorithm, a first-in first-out scheduling algorithm, and/or a sequential algorithm that selects the next LVM from a list of LVMs.

The host 110 may be a computer system or computing device that may be used by the client 101 or other users in the network architecture 100. For example, the host 110 may be a desktop computer or a laptop computer that is part of the network architecture 100. As discussed above, the host 110 may use the LVM 145 to access, write, read and/or store data in the logical data storage 105 (e.g., store data on the logical volume 160 or read data from the logical volume 180). In another embodiment, the host 110 may be used to access, write, read and/or store data in the logical data storage 105 for one of the clients 101.

The host 109 may host one or more virtual machines (VMs) 131. Each virtual machine (VM) 131 includes a guest operating system (guest OS) 133 that may be different from one virtual machine to another. The guest OS 133 may include, but is not limited to, a Microsoft Windows® OS, a Linux® OS, a Solaris® OS, a Mac® OS, Fedora, etc. The host 109 may include a hypervisor 132 that emulates the underlying hardware platform for the VMs 131. The hypervisor 132 may also be known as a virtual machine monitor (VMM) or a kernel-based hypervisor. In some embodiments, the hypervisor 132 may be part of a host operating system. Although FIG. 1A shows one host 109, in other embodiments, the network architecture 100 may include multiples hosts 109, with each host 109 include a hypervisor (e.g., hypervisor 132) and one or more VMs (e.g., VM 131). In one embodiment, each of the VMs 131 may access the logical data storage 105 (e.g., read or write data to the logical data storage) using the LVM 135. In another embodiment, each of the VMs 131 may also include an LVM and the each VM 131 may use its own LVM, rather than LVM 135, to access the logical data storage 105.

The clients 101 may include computing devices that have a wide range of processing capabilities such as PCs, PDAs, smart phones, laptop computers, etc. The clients 101 may access the VMs 131 over the network 102. In one scenario, each VM 131 provides a virtual desktop for the client 101. From the user's point of view, the virtual desktop functions as a physical desktop (e.g., a personal computer) and is indistinguishable from a physical desktop.

The host 109 may be managed by a host controller 107. The host controller 107 may be a computer coupled to the host 109 directly or via the network 102. The host controller 107 may also be in communication with the clients 101, via the network 102. Alternatively, the host controller 107 may be part of one of the hosts 109 or 110. In one embodiment, the host controller may include a VM manager 119. The VM manager 119 may add, remove, configure and/or modify the VMs 131 and/or the host 109. For example, VM manager 119 may add a new VM, remove an existing VM, change or reconfigure a VM (e.g., add/remove/replace virtual hardware), power on/off the host 109, provide directory service to the VMs 131, and perform other managerial functions. As discussed above, the host controller 107 may use the LVM 115 to access, write, read and/or store data in the logical data storage 105 (e.g., store data on the logical volume 170 or read data from the logical volume 189).

The host controller 107 includes a VM manager 119 to monitor, configure, and/or manage the VMs 131. In one embodiment, the VM manager 119 may use a module, or tool to analyze a VM 131 and determine the guest OS used by the VM 131, the virtual hardware components installed on the VM 131, and/or the software installed on the VM 131. In another embodiment, the VM manager 119 may reconfigure (e.g., add and/or change virtual hardware components) a VM 131. For example, the VM manager 119 may add new virtual hardware component to a VM 131. In another example, the VM manager 119 may remove a virtual hardware component from the VM 131. In a further example, the VM manager 119 may add, remove, and/or update software (e.g., an application, an operating system, a module, a driver, etc.) installed on the VM 131.

In one embodiment, the VM manager 119, the VMs 131, and the hypervisor 132 may communicate with each other using a virtio-serial mechanism, which may be a mechanism for communication in a virtualization system via multiple channels of a paravirtualized device. More specifically, a virtio-serial mechanism may provide a transport mechanism in a host machine for communication between the host userspace and/or kernelspace and the VM userspace and/or kernelspace. This transport mechanism may be a communication channel between the host machine and the VM with support for multiple ports, where stream input/output (I/O) is provided on each port. The transport mechanism may have two parts: (1) device emulation in the hypervisor that presents a device to the VM, and (2) a VM device driver that presents an interface to userspace or kernelspace applications on the VM in order to communicate with the hypervisor, to programs external to the hypervisor, and/or with other VMs. The communication channel may be virtio-based, where virtio is an abstraction over a native bus for an architecture so that virtio-based devices can be used for VM-host paravirtual communication, irrespective of the architecture of the VM or the host. For example, virtio is emulated on top of PCI on x86, whereas it uses a native bus on the s390 architecture. Alternatively, the VM manager 119, the hypervisor 132, and the VMs 131 may communicate using any other communication mechanism allowing exchange of messages between a virtual machine and a host controller.

Figure 1B:
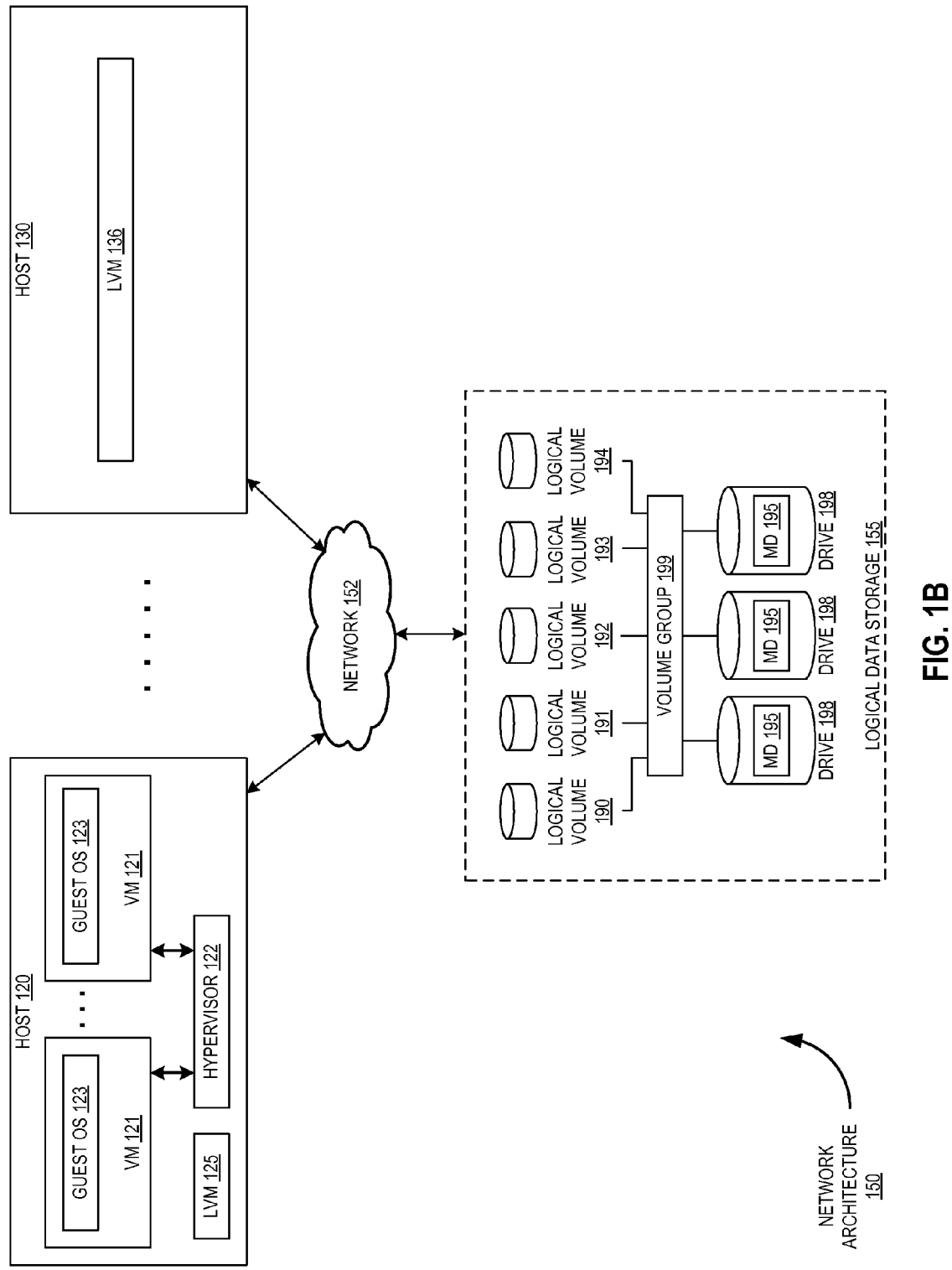
FIG. 1B is a block diagram of a second example network architecture in which some embodiments of the disclosure may operate.

FIG. 1B is a block diagram of a second example network architecture 150 in which some embodiments of the disclosure may operate. The network architecture 150 includes hosts 120 and 130, a logical data storage 155, and a network 152. The hosts 120 and 130 may be a personal computer (PC), a server computer, a personal digital assistant (PDA), a smart phone, a laptop computer, a tablet computer, or any machine capable of executing a set of instructions (sequential or otherwise) that specify actions to be taken by that machine. The network 152 may be a private network (e.g., a local area network (LAN), a wide area network (WAN), intranet, etc.), a wireless network (e.g., a Wi-Fi network or a cellular network), or a public network (e.g., the Internet). Host 120 includes LVM 125 and host 130 includes LVM 136. The hosts 120 and 130 are coupled to logical data storage 155 via the network 152. The logical data storage 155 includes drives 198. The hosts 120 and 130 may use their corresponding LVMs (e.g., LVM 125 and LVM 136) to access and/or manage the drives 198 and the logical data storage 155.

As discussed above the LVM 125 and/or 136 may manage, allocate, and use the drives 198 in the logical data storage 155. The LVM 125 and/or 136 may partition, allocate, and/or organize the drives 198 according to a logical organization or structure. The drives 198 are grouped together to form volume group 199. Portions the drives 198 may also be grouped together to form multiple volume groups (not shown in the figure). The LVM 125 and/or 136 may use the volume group 199 to create logical volumes 190, 191, 192, 193, and 194. A logical volume may be a virtual disk partition (e.g., a partition that may not be based on actual physical partitions and/or physical drives). The LVM 125 and/or 136 may use metadata (MD or LVM metadata) 195 to store the configuration details of the logical volumes 190, 191, 192, 193, and 194. The metadata 195 stored on the drives 198 may indicate that the drives 198 are part of one of the logical volumes 190, 191, 192, 193, and 194. In one embodiment, the metadata 195 may indicate a mapping between the drives 198 and the logical volumes 190, 191, 192, 193, and 194 (e.g., may indicate which drives or portions of the drives are mapped to or used by which logical volumes). In one embodiment, the metadata 195 (e.g., LVM metadata) may be "committed" or finalized metadata that has been made permanent and will be used for accessing the logical data storage 155 (e.g., for accessing the one or more of the logical volumes 190, 191, 192, 193, and 194).

In one embodiment, the LVM 125 and/or 136 may update one or more of the logical volumes 190, 191, 192, 193, 194 and/or volume group 199. When the LVM 125 and/or 136 updates and/or modifies the logical data storage 155, the LVM 125 and/or 136 may modify the metadata 195 stored on the drives 198 to update metadata 195 with the configuration details for the new logical structure. In one embodiment, the LVM 125 may create the new metadata (shown in FIG. 2A) that contains the new configuration details for the new logical structure when the LVM 125 and/or 136 modifies and/or updates the logical data storage 155. The new metadata may not take effect (e.g., may not be used by the LVMs 125 and 136) until the new metadata is committed or finalized by the LVM 125 and/or 136.

In one embodiment, LVM 125 and/or 136 may each operate in one of two different modes. If an LVM (e.g., LVM 125) is operating in a first mode (e.g., a write access mode or a write mode), the LVM may be allowed to write new metadata and delete uncommitted metadata if the LVM determines that there is uncommitted metadata stored on the drives. If an LVM is operating in a second mode (e.g., a read-only mode or a read mode), the LVM may not be permitted to delete uncommitted data if the LVM determines that there is uncommitted metadata stored on the drives and may not be permitted to write new metadata to the drives. In one embodiment, only one LVM in a group of LVMs may operate in the first mode (e.g., write access mode or write mode) at any given time. The remaining LVMs in the group of LVMs may operate in the second mode (e.g., read-only mode or read mode). In another embodiment, when a group of LVMs share access to the logical data storage 155, the different LVMs may switch between operating in the first mode (e.g., write mode) and the second mode (e.g., read mode). In one embodiment, a central computing device or computing system (e.g., a server) may select which one of the LVMs in a group of LVMs (e.g., LVM 125 and 136) may operate in the first mode (e.g., write mode). In another embodiment, the different LVMs in the group may work in combination with each other to select one of the LVMs to operate in the first mode (e.g., the LVMs may use a leader election algorithm).

The host 130 may be a computer system or computing device that may be used by the client 101 or other users in the network architecture 150. For example, the host 130 may be a desktop computer or a laptop computer that is part of the network architecture 150. The host 130 may use the LVM 136 to access, write, read and/or store data in the logical data storage 155 (e.g., store data on the logical volume 160 or read data from the logical volume 180). The host 120 may host one or more virtual machines (VMs) 121. Each virtual machine (VM) 121 includes a guest operating system (guest OS) 123 that may be different from one virtual machine to another. The host 120 may include a hypervisor 122 that emulates the underlying hardware platform for the VMs 121. The hypervisor 122 may also be known as a virtual machine monitor (VMM) or a kernel-based hypervisor. In some embodiments, the hypervisor 122 may be part of a host operating system.

Figure 2A:
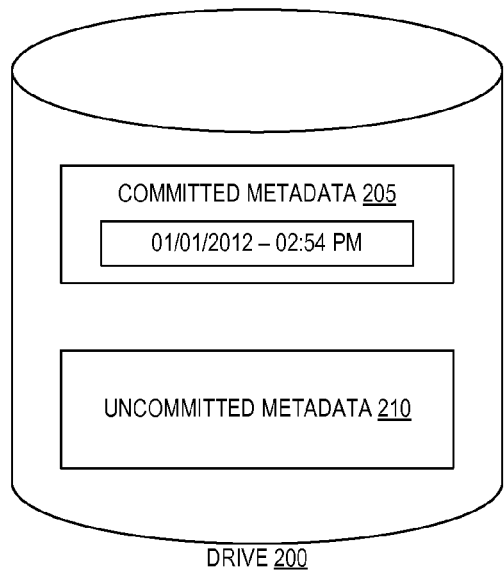
FIG. 2A is a block diagram of a drive and metadata, according to one embodiment.

FIG. 2A is a block diagram of a drive 200 and metadata 205 and 210, according to one embodiment. The drive 200 may be part of a logical data storage (e.g., logical data storage 105 shown in FIG. 1A). The drive 200 includes committed metadata 205. In one embodiment, the committed metadata 205 may be LVM metadata that an LVM has previously finalized and made permanent (e.g., previously committed). The committed metadata 205 may be used by the current LVM or other LVMs when accessing the logical data storage to access the drive 200. The committed metadata 205 includes information and/or data indicating the time that the committed metadata 205 was committed or finalized. As shown in FIG. 2A, the committed metadata 205 was committed on Jan. 1, 2012, at 2:54 PM. In other embodiments, the committed metadata 205 may include other types of data or information to indicate when the metadata 205 was committed. For example, the committed metadata may include a timestamp, a string, a value, and/or a number. The drive 200 also includes uncommitted metadata 210. The uncommitted metadata 210 may be LVM metadata that has not been finalized or made permanent. The uncommitted metadata 210 may be from an LVM that is updating and/or modifying the logical data storage (e.g., adding a drive to a volume group or logical volume, reallocating a drive to another volume group or logical volume, etc.). However, because the uncommitted metadata 210 has not been committed, other LVMs may not use the uncommitted metadata 210 when accessing the logical data storage. As discussed above, when an LVM operates in a first mode (e.g., in a write mode), the LVM may delete the uncommitted metadata 210 and/or may create new uncommitted metadata, if the LVM is accessing, updating, and/or modifying the logical data storage.

Figure 2B:
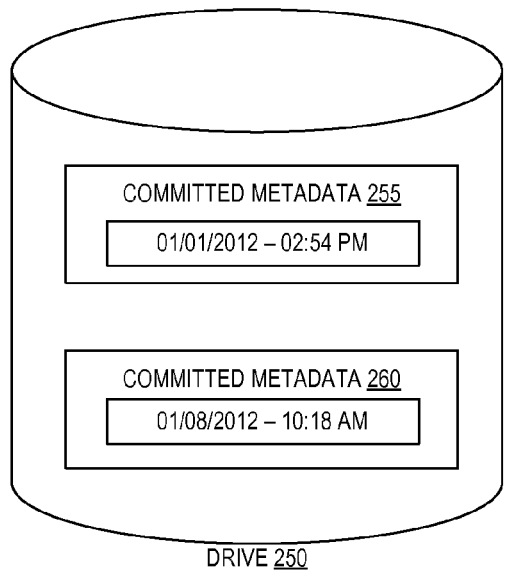
FIG. 2B is a block diagram of a drive and metadata, according to another embodiment.

FIG. 2B is a block diagram of a drive 250 and metadata 255 and 260, according to another embodiment. The drive 250 may be part of a logical data storage (e.g., logical data storage 105 shown in FIG. 1A). The drive 250 includes committed metadata 255 and 260. In one embodiment, the committed metadata 250 and 260 may be LVM metadata that an LVM has previously finalized and made permanent. The committed metadata 255 and 260 both include information and/or data indicating the time that the committed metadata 255 and 260 were committed or finalized. As shown in FIG. 2B, the committed metadata 255 was committed on Jan. 1, 2012, at 2:54 PM and the metadata 260 was committed on Jan. 8, 2012, at 10:18 AM. In other embodiments, the committed metadata 205 may include other types of data or information to indicate when the metadata 205 was committed. In one embodiment, an LVM may use the metadata 260 when accessing the logical data storage regardless of whether it is operating in the first mode or the second mode, because the metadata 260 is the most recently committed metadata on the drive 250 (e.g., is the latest metadata). In another embodiment, the LVM may delete the committed metadata 255 because the committed metadata 255 should no longer be used after the committed metadata 260 is finalized.

Figure 3:
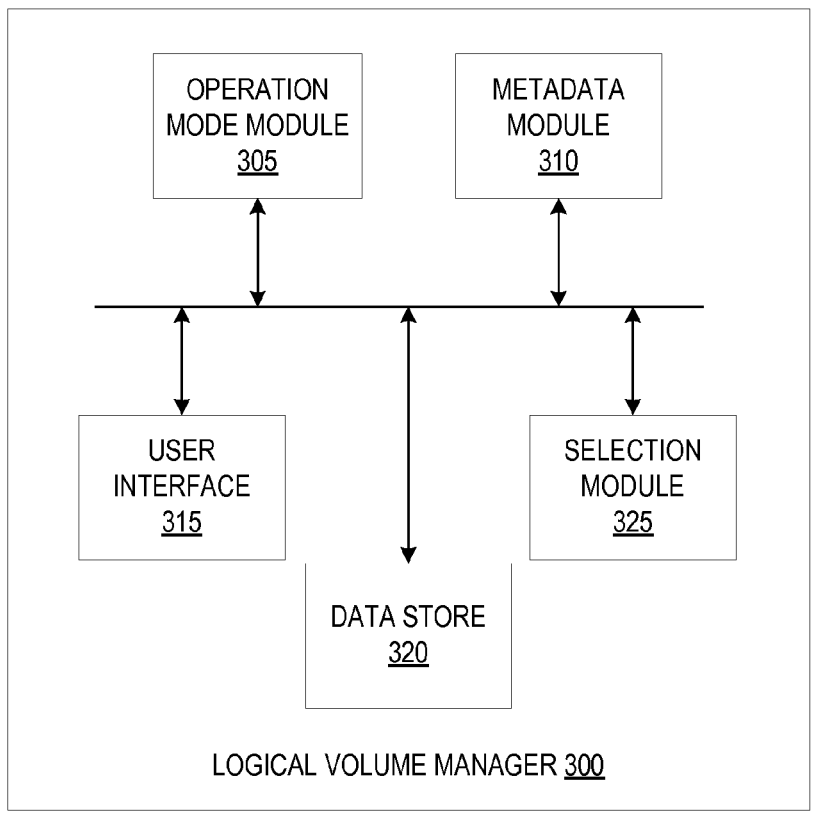
FIG. 3 is a block diagram of a logical volume manager, according to an embodiment.

FIG. 3 illustrates a block diagram of an LVM 300, according to an embodiment. The LVM 300 may include an operation mode module 305, a metadata module 310, a user interface 315, a data store 320, and a selection module 325. More or less components may be included in the logical volume manager 300 without loss of generality. For example, two of the modules may be combined into a single module, or one of the modules may be divided into two or more modules. In one embodiment, one or more of the mode module 305, a metadata module 310, a user interface 315, a data store 320, and a selection module 325 may reside on different computing systems (e.g., different server computers). In one embodiment, the LVM 300 may access one or more drives or logical volumes in a logical data storage (e.g., access one or more logical volumes that use the one or more drives), and/or may update the logical data storage. For example, the LVM 300 may receive requests from VMs or other computing systems, to access a logical volume in the logical data storage, to create a new logical volume, and/or to reallocate a drive from one logical volume to another logical volume.

The operation mode module 305 may determine whether the LVM 300 should operate in a first mode (e.g., a write mode) or a second mode (e.g., a read mode). In one embodiment, the operation mode module 305 may receive a message, notification, and/or other data from a computer system (e.g., from a server computer) indicating whether the LVM 300 should operate in the first mode or the second mode. In another embodiment, the operation mode module 305 may determine that the LVM 300 should operate in the second mode by default, unless a message, notification and/or other data is received indicating that the LVM 300 should operating in the first mode. In one embodiment, the operation mode module 305 may access a flag, a file, and/or other data stored in the data store 320 to determine whether the LVM 300 should operate in the first mode or the second mode. For example, another computer system (e.g., a server computer system such as host controller 107 in FIG. 1A) may send a message to the LVM 300 indicating that the LVM 300 should operate in the second mode. The operation mode module 305 may store this information in a file, flag, and/or other data structure in the data store 320 for future use. When the LVM 300 is later restarted, the LVM 300 may access the data store 320 to determine which mode the LVM 300 should operate in.

The metadata module 310 may access metadata stored on a drive when the LVM 300 accesses the logical data storage. For example, when the LVM 300 is accessing a file (e.g., reading a file) stored on a drive in the logical data storage, the metadata module 310 may access the metadata stored on the drive. In one embodiment, the metadata module 310 may use the latest committed metadata on the drive if there are multiple committed metadata on the drive (e.g., if there are two committed metadata on the drive). In another embodiment, if there is an uncommitted metadata and a committed metadata on the drive, the metadata module may use the committed metadata. If the LVM 300 is operating in the first mode (e.g., write mode), the metadata module 310 may also delete the uncommitted metadata. If the LVM 300 is operating in the second mode (e.g., write mode), the metadata module 310 may not delete the uncommitted metadata (e.g., may refrain from deleting the uncommitted metadata). The metadata module 310 may also write new metadata do the drive if the LVM 300 is operating in the first mode. For example, when the LVM 300 allocates the drive from one logical volume to another logical volume in the logical data storage, the LVM 300 may create new metadata to reflect the new configuration of the logical data storage and may commit the new metadata.

The user interface 315 may be a graphical user interface that allows a user to access and/or manage the logical data storage. For example, a user may use the user interface 315 to add a new drive to the logical data storage. In another example, the user may use the user interface to reallocate a drive from one logical volume to another. The user interface 315 may present one or more graphical user interface elements (e.g., text, images, numbers, buttons, radio buttons, lists, text fields, graphs, icons, menus, drop down menus, etc.) to the user. The user interface 315 may receive user input (e.g., may receive button clicks, text typed in a text field) and the LVM 300 may access and/or manage based on the user input received via the user interface 315.

The data store 320 may store data used by the LVM 300 to determine whether the LVM 300 should operate in the first mode or the second mode. For example, the data store 320 may store data indicating that the LVM 300 should run in a first mode (e.g., because the LVM 300 was previously instructed to or set to operate in the first mode). The data store 320 may be a memory (e.g., random access memory), a cache, a drive (e.g., a hard drive), a flash drive, or another type of component or device capable of string data. The data store 320 may also store other information used by the LVM 300, such as the location of the logical volumes or drives used in the logical data storage.

As discussed above, in one embodiment, multiple LVMs may use a logical data storage. The multiple LVMs may work in combination to select one of the LVMs (e.g., to perform a selection process) to operate in the first mode (e.g., the write mode). For example, the different LVMs may use a leader election algorithm to determine which LVM should operate in the first mode. In another example, the different LVMs may transmit messages to each other or to a central server indicating whether the LVMs need to operate in the first mode (e.g., an LVM may need to operate in the first mode if it wants to update the structure of the logical data storage). The different LVMs may select an LVM to operate in the first mode based on the order in which the messages are received. The selection module 325 may perform the selection process when multiple LVMs share a logical data storage. For example, the selection module 325 may use a leader election algorithm in conjunction with other selection modules in other LVMs to selected one LVM that will operate in the first mode. In another example, the selection module 325 may transmit a message to a central server or other LVMs indicating that the LVM 300 needs to operate in the first mode (e.g., to write new metadata to a drive).

Figure 4:
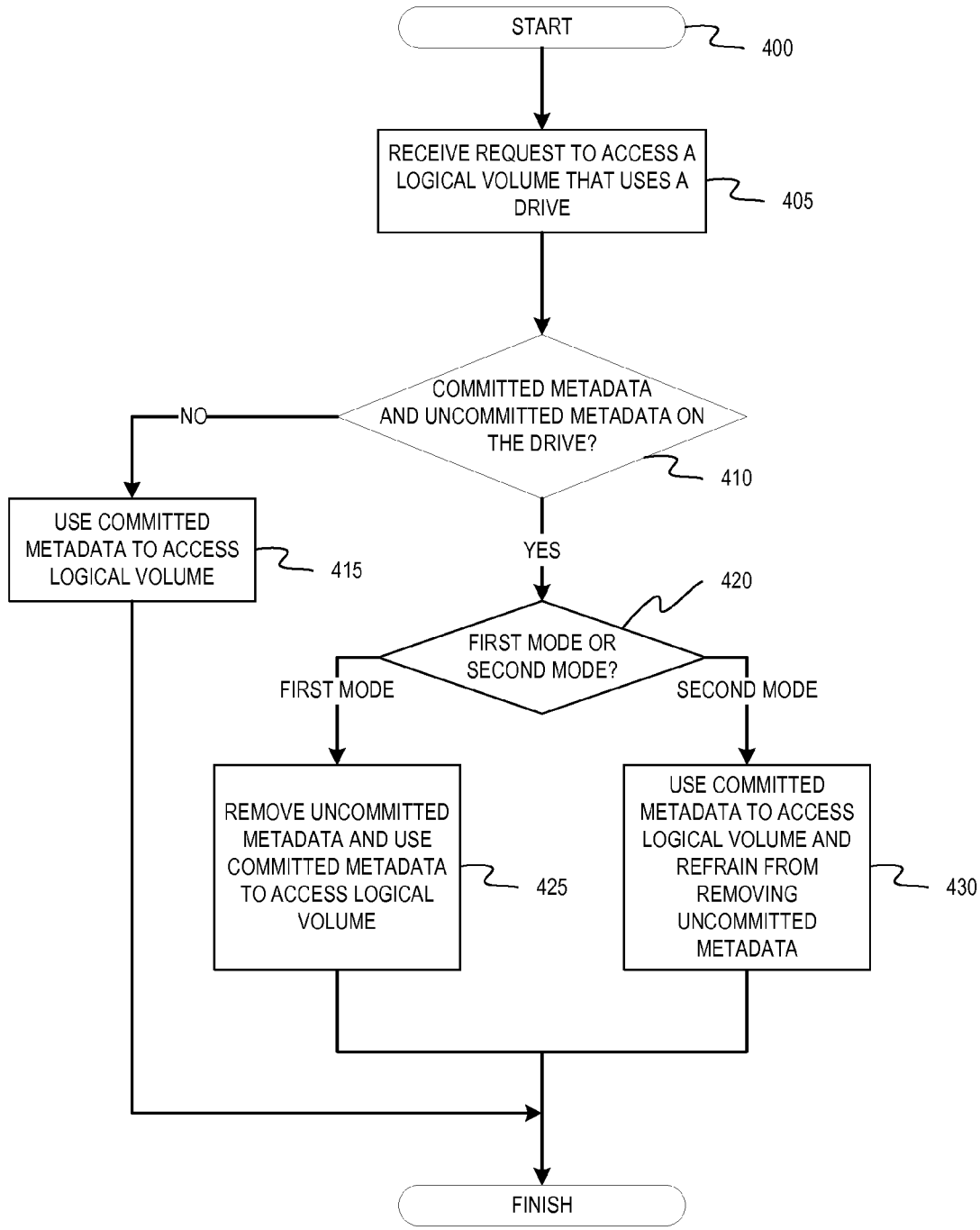
FIG. 4 is a flow diagram illustrating a method of managing a logical data storage, according to one embodiment.
Figure 5:
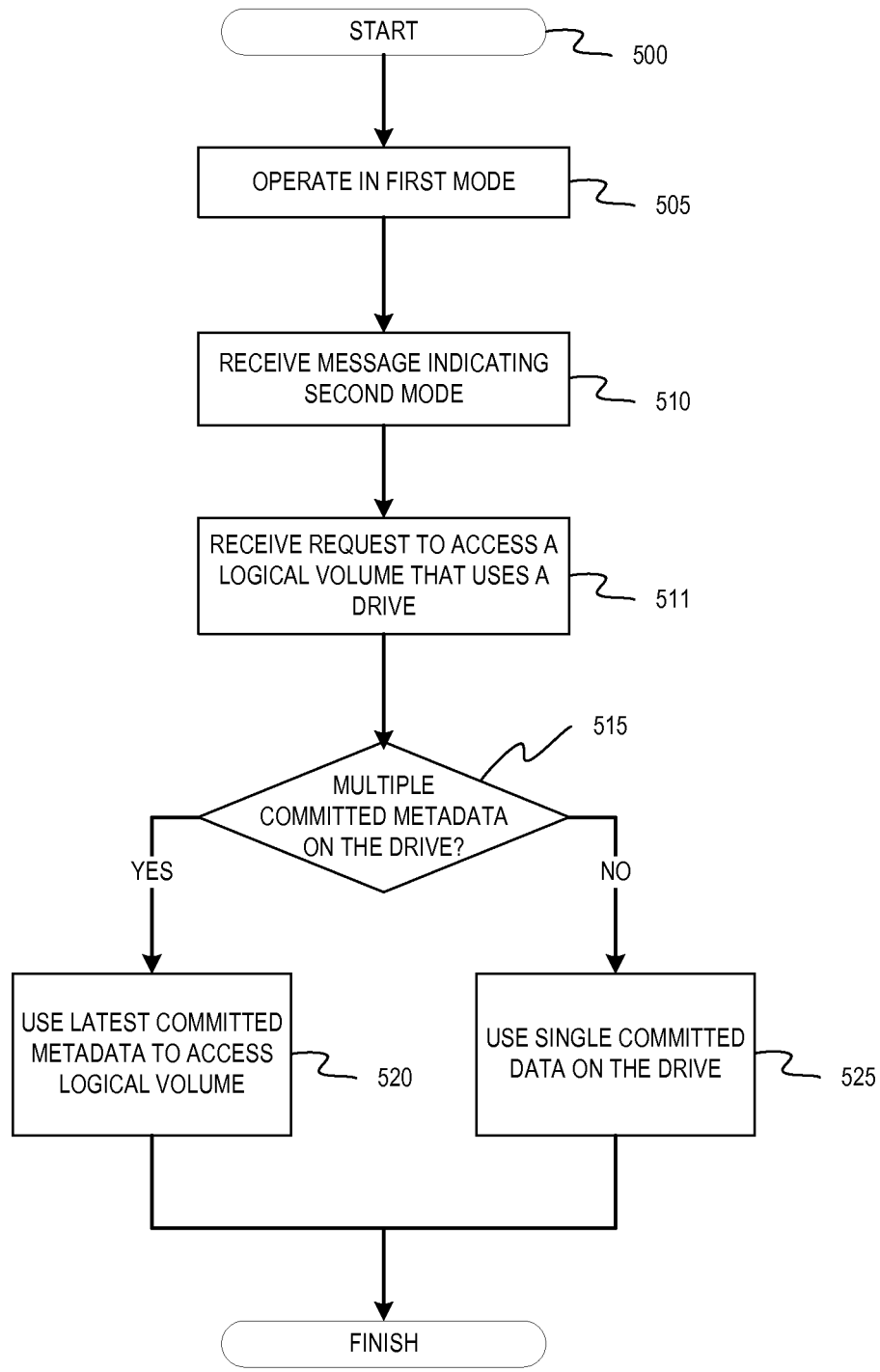
FIG. 5 is a flow diagram illustrating a method of managing a logical data storage, according to another embodiment.
Figure 6:
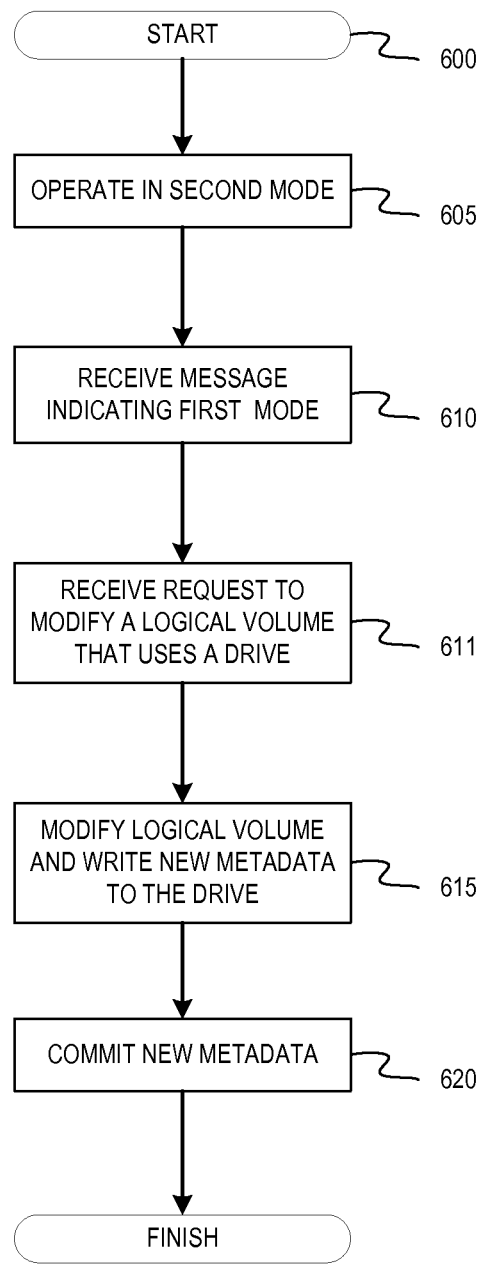
FIG. 6 is a flow diagram illustrating a method of managing a logical data storage, according to a further embodiment.

FIGS. 4-6 are flow diagrams illustrating example methods for managing a logical data storage. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 4 is a flow diagram illustrating a method 400 of managing a logical data storage, according to one embodiment. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 may be performed by an LVM (e.g., the LVM 300 of FIG. 3).

Referring to FIG. 4, the method 400 starts with the LVM receiving a request to access a logical volume that uses a drive (or multiple drives), at block 405. For example, the LVM may receive a request to access data stored on the logical volume. In another example, the LVM may receive a request to modify the logical volume (e.g., add or remove a drive from the logical volume). In a further example, the LVM may receive a request to add or create a new logical volume. At block 410, the LVM determines whether there are both committed metadata and uncommitted metadata on the drive. If there is no uncommitted metadata on the drive, the LVM uses the committed metadata to access the logical volume (block 415). For example, the LVM may read data from the logical volume or write data to the logical volume, using the committed metadata. In one embodiment, if there are multiple committed metadata on the disk, the LVM may use the latest committed metadata (e.g., the most recently committed metadata). After block 415, the method 400 ends.

If there are both committed metadata and uncommitted metadata on the drive, the LVM determines whether the LVM is operating in a first mode (e.g., a write mode) or a second mode (e.g., a read mode) at block 420. For example, the LVM may check a flag, a file, or other data in a memory or a data store to determine whether the LVM should be running in the first mode or the second mode. If the LVM is operating in the first mode, the LVM may remove or delete the uncommitted metadata (e.g., because a previous, different LVM crashed before committing the metadata) and may use the committed metadata to access the logical volume at block 425. After block 425, the method 400 ends. If the LVM is operating in the second mode, the LVM may use the committed metadata to access the logical volume and may refrain from deleting or removing the uncommitted metadata. After block 430, the method 400 ends.

FIG. 5 is a flow diagram illustrating a method 500 of managing a logical data storage, according to another embodiment. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 may be performed by an LVM (e.g., the LVM 300 of FIG. 3).

Referring to FIG. 5, the method 500 begins at block 505 with the LVM operating in a first mode (e.g., a write mode). At block 510, the LVM receives a message indicating that the LVM should switch to operating in a second mode (e.g., a read mode). For example, the LVM may receive the message from a server computer or from another LVM. At block 511, the LVM receives a request to access a logical volume that uses a drive in the logical data storage. For example, the LVM may receive a request to read a file from the logical volume, or write a file to the logical volume. The LVM determines whether there are multiple committed metadata on a drive at block 515. If there are multiple committed metadata on the drive, the LVM uses the latest committed metadata on the drive (e.g., the most recently committed metadata) at block 520. After block 520, the method 500 ends. If drive does not have multiple committed metadata (e.g., there is only one committed metadata), the LVM uses the single committed metadata to access the drive at block 525. After block 525, the method 500 ends.

FIG. 6 is a flow diagram illustrating a method 600 of managing a logical data storage, according to a further embodiment. The method 600 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 600 may be performed by an LVM (e.g., the LVM 300 of FIG. 3).

Referring to FIG. 6, the method 600 starts at block 605 with the LVM operating in a second mode (e.g., a read mode). At block 610, the LVM receives a message indicating that the LVM should switch to operating in the first mode (e.g., a write mode). The LVM receives a request to modify a logical volume that uses a drive at block 611. For example, the LVM may receive a request to add a new drive to a logical volume or to remove a drive from a logical volume. The LVM may update or modified the logical volume and may write new metadata to the drive to reflect the updated or modified logical volume (block 615). At block 620 the LVM commits the new metadata. After block 620, the method 600 ends.

Figure 7:
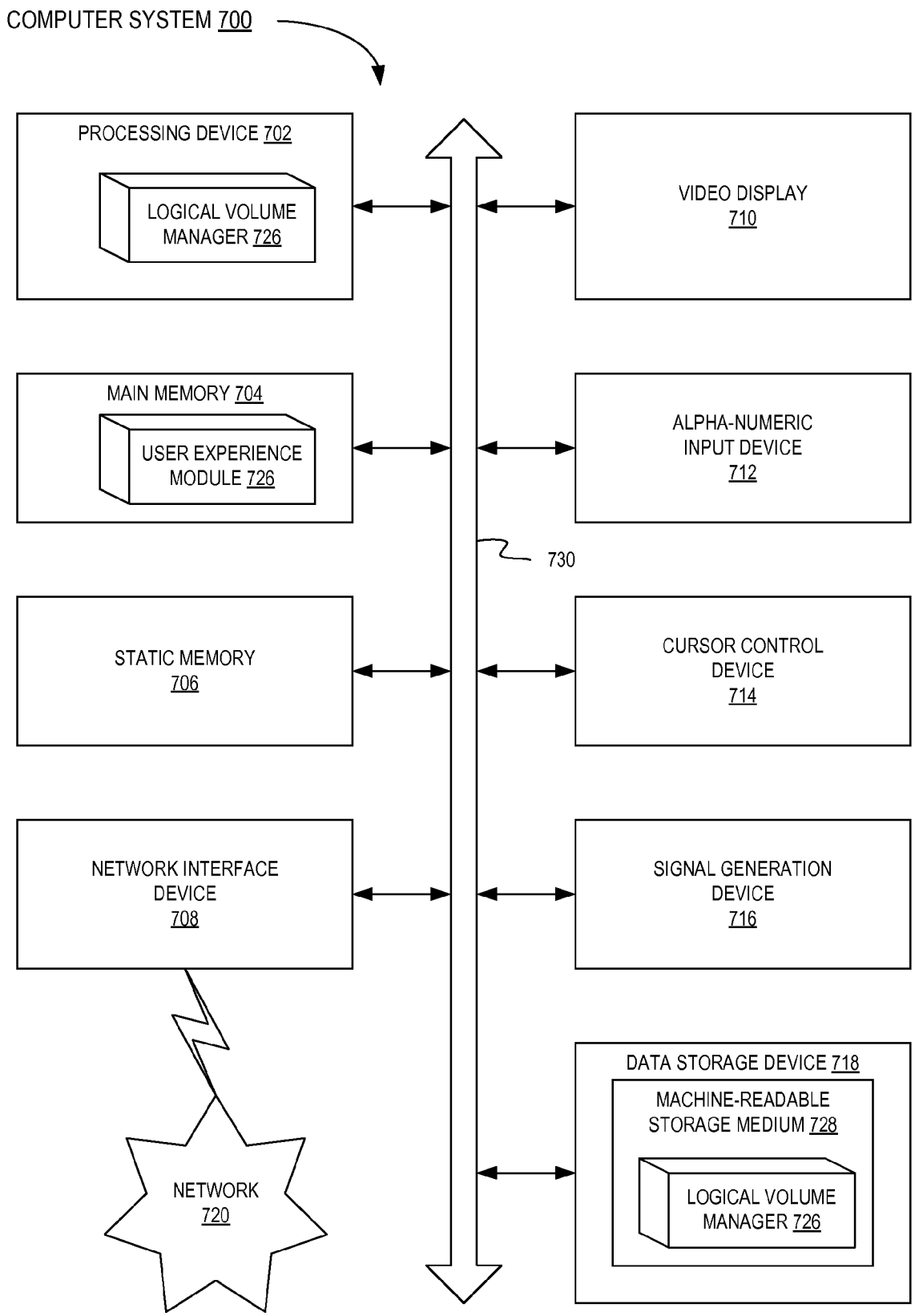
FIG. 7 illustrates a diagrammatic representation of a machine in the example form of a computer system, in accordance with one embodiment.

FIG. 7 illustrates a diagrammatic representation of a machine in the example form of a computer system 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the LVM 726 for performing the operations and steps discussed herein.

The computer system 700 may further include a network interface device 708 which may communicate with a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker).

The data storage device 718 may include a computer-readable medium 728 on which is stored one or more sets of instructions (e.g., instructions of LVM 726) embodying any one or more of the methodologies or functions described herein. The LVM 726 may also reside, completely or at least partially, within the main memory 704 and/or within the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "removing," "transmitting," "receiving," "using," "accessing," "switching," "displaying," "obtaining," "reading," "writing," "committing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely examples. Particular implementations may vary from these example details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a first request to access a logical volume in a plurality of logical volumes;
determining, by a logical volume manager executable by a processing device, when a committed metadata and an uncommitted metadata are in a drive used by the logical volume, wherein the logical volume manager is to manage the plurality of logical volumes and wherein the plurality of logical volumes use a plurality of drives;
determining when to operate in a first mode or a second mode when the committed metadata and the uncommitted metadata are on the drive;
removing the uncommitted metadata from the drive and accessing the logical volume using the committed metadata to when operating in the first mode; and
accessing the logical volume using the committed metadata and refraining from removing the uncommitted metadata when operating in the second mode.

2. The method of claim 1, wherein determining whether to operate in the first mode or the second mode comprises:
receiving a message indicating to operate in the first mode or the second mode; and
determining whether to operate in the first mode or the second mode in view of the message.

3. The method of claim 1, wherein determining whether to operate in the first mode or the second mode comprises:
accessing a flag stored in a memory; and
determining whether to operate in the first mode or the second mode in view of the flag.

4. The method of claim 1, wherein operating in the first mode further comprises:
   receiving a message indicating to operate in the second mode; and
   switching to the second mode.

5. The method of claim 1, wherein operating in the first mode further comprises:
   receiving a message indicating to operate in the first mode; and
   switching to the first mode.

6. The method of claim 4, further comprising:
   receiving a second request to access the logical volume;
   determining when multiple committed metadata are stored on the drive; and
   accessing the logical volume using a latest committed metadata when there are multiple committed metadata stored on the drive.

7. The method of claim 4, further comprising:
   receiving a second request to modify the logical volume;
   modifying the logical volume in view of the second request;
   writing new metadata to the drive, wherein the new metadata is indicative of modifications to the logical volume; and
   committing the new metadata.

8. The method of claim 1, wherein the committed metadata indicates a mapping between the plurality of logical volumes and one or more of the plurality of drives or portions of the plurality of drives.

9. A system comprising:
   a memory;
   a processing device coupled to the memory; and
   a logical volume manager, executable from the memory by the processing device, the logical volume manager to:
      receive a first request to access a logical volume in a plurality of logical volumes;
      determine when a committed metadata and an uncommitted metadata are in a drive used by the logical volume, wherein the logical volume manager is to manage the plurality of logical volumes and wherein the plurality of logical volumes use a plurality of drives;
      determine when to operate in a first mode or a second mode, when the committed metadata and the uncommitted metadata are stored on the drive;
      remove the uncommitted metadata and access the logical volume using the committed metadata when operating in the first mode; and
      access the logical volume using the committed metadata and refrain from removing the uncommitted metadata when operating in the second mode.

10. The system of claim 9, wherein determining whether to operate in the first mode or the second mode comprises:
    receiving a message indicating to operate in the first mode or the second mode; and
    determining whether to operate in the first mode or the second mode in view of the message.

11. The system of claim 9, wherein determining when to operate in the first mode or the second mode comprises:
    accessing a flag stored in the memory; and
    determining when to operate in the first mode or the second mode in view of the flag.

12. The system of claim 9, wherein when operating in a first mode the logical volume manager is further to:
    receive a message indicating to operate in the second mode; and
    switch to the second mode.

13. The system of claim 9, wherein when operating in the second mode the logical volume manager is further to:
    receive a message indicating to operate in the first mode; and
    switch to the first mode.

14. The system of claim 13, wherein the logical volume manager is further to:
    receive a second request to access the logical volume;
    determine when multiple committed metadata are stored on the drive; and
    access the logical volume using a latest committed metadata when there are multiple committed metadata in the drive.

15. The system of claim 13, wherein the logical volume manager is further to:
    receive a second request to modify the logical volume;
    modify the logical volume, in view of the second request;
    write new metadata to the drive, wherein the new metadata is indicative of modifications to the logical volume; and
    commit the new metadata.

16. A non-transitory computer readable storage medium having instructions that, when executed by a processing device, cause the processing device to:
    receive, by the processing device, a first request to access a logical volume in a plurality of logical volumes;
    determine, by the processing device, when a committed metadata and an uncommitted metadata are stored on a drive used by the logical volume, wherein the processing device is to manage the plurality of logical volumes and wherein the plurality of logical volumes use a plurality of drives;
    determine, by the processing device, when to operate in a first mode or a second mode when the committed metadata and the uncommitted metadata are on the drive;
    remove, by the processing device, the uncommitted metadata and accessing the logical volume using the committed metadata when operating in the first mode; and
    accessing the logical volume using the committed metadata and refraining from removing the uncommitted metadata when operating in the second mode.

17. The non-transitory computer readable storage medium of claim 16, wherein to determine when to operate in the first mode or the second mode, the processing device is further to:
    receive, by the processing device, a message indicating to operate in the first mode or the second mode; and
    determine, by the processing device, whether to operate in the first mode or the second mode in view of the message.

18. The non-transitory computer readable storage medium of claim 16, wherein to determine when to operate in the first mode or the second mode comprises:
    access, by the processing device, a flag stored in a memory; and
    determine, by the processing device, when to operate in the first mode or the second mode in view of the flag.

19. The non-transitory computer readable storage medium of claim 16, wherein when operating in the first mode the processing device is further to:
    receive a message indicating to operate in the second mode; and
    switch to the second mode.

20. The non-transitory computer readable storage medium of claim 16, wherein when operating in the second mode the processing device is further to:
    receive a message indicating to operate in the first mode;
    switch to the first mode;
    receive a second request to modify the logical volume;

modify the logical volume, in view of the second request;
write new metadata to the drive, wherein the new metadata is indicative of modifications to the logical volume; and
commit the new metadata.

* * * * *